United States Patent [19]

Hasan et al.

[11] Patent Number: 5,018,329

[45] Date of Patent: May 28, 1991

[54] ATTACHMENT OF ROOFING WASHER WITH HEAT-SEALED SCREW-WASHER ASSEMBLAGE

[75] Inventors: S. Riaz Hasan, Palatine; Louis Thomas, Maywood, both of Ill.

[73] Assignee: Illinois Tool Works Inc., Glenview, Ill.

[21] Appl. No.: 528,914

[22] Filed: May 25, 1990

Related U.S. Application Data

[63] Continuation of Ser. No. 417,368, Oct. 5, 1989, abandoned.

[51] Int. Cl.$^5$ .............................................. E04B 5/00
[52] U.S. Cl. ...................................... 52/410; 52/409; 52/512; 52/467; 52/741; 411/915; 411/377
[58] Field of Search ................. 52/409, 410, 411, 412, 52/467, 509, 506, 512, 713, 741, 743, 748; 411/82, 258, 372, 373, 377, 915

[56] References Cited

U.S. PATENT DOCUMENTS

| | | | |
|---|---|---|---|
| 4,074,501 | 2/1978 | Sandqvist | 52/741 |
| 4,282,050 | 8/1981 | Thiis-Evensen | 52/460 X |
| 4,380,413 | 4/1983 | Dewey | 411/161 |
| 4,476,660 | 10/1984 | Francovitch | 52/467 X |
| 4,663,910 | 5/1987 | Hasan | 52/410 |
| 4,686,808 | 8/1987 | Triplett | 52/410 |
| 4,712,959 | 12/1987 | Hasan | 411/533 |
| 4,726,164 | 2/1988 | Reinwall et al. | 52/512 X |
| 4,744,187 | 5/1988 | Tripp | 52/410 |
| 4,757,661 | 7/1988 | Hasan | 52/410 |
| 4,860,514 | 8/1989 | Kelly | 52/512 X |

Primary Examiner—Henry E. Raduazo
Assistant Examiner—Creighton Smith
Attorney, Agent, or Firm—Neal C. Johnson; Thomas W. Buckman

[57] ABSTRACT

An improved method of attaching a roofing membrane to an underlayment and an improved roofing construction made by the improved method. A screw and a composite roofing washer are used to attach the membrane to the underlayment. The composite roofing washer is an interlocked assemblage of a metal roofing washer and a thermoplastic insert. After the screw has been driven, the thermoplastic insert is heated so as to cause some of the material of the thermoplastic insert to flow over the head of the screw, thereby to heat-seal the screw to the thermoplastic insert. The thermoplastic insert may be so heated when the roofing membrane is welded to another like membrane at an overlapped seam.

13 Claims, 4 Drawing Sheets

ATTACHMENT OF ROOFING WASHER WITH HEAT-SEALED SCREW-WASHER ASSEMBLAGE

Technical Field of the Invention

This invention pertains to an improved method for attaching a sheet of roofing material, such as a roofing membrane, to an underlayment, such as a metal or wooden deck. The improved method employs a screw and a composite roofing washer, which is an assemblage of a metal roofing washer and a thermoplastic insert. This invention pertains also to an improved roofing construction, as made by the improved method, and to a heat-sealed screw-washer assemblage useful in the improved method.

BACKGROUND OF THE INVENTION

Commonly, a roofing membrane covering one or more layers of roofing insulation is attached to an underlayment, such as a metal or wooden deck, by screws and roofing washers. Galvanized steel roofing washers, polymeric roofing washers, and galvanized steel roofing washers having polymeric inserts are used.

It is known that wind and other forces produce vibrations tending to cause such a screw to work loose by causing such a roofing washer to act as a lever transmitting such forces to the screw head. As a palliative measure, it is known to form an integral assembly of such a screw and such a roofing washer, whereby it tends to be more difficult for the screw to work loose.

It is known to form such an assembly wherein the roofing washer is made from a polymeric material or has a polymeric insert, as mentioned above, and wherein the screw head is retained by being snap-fitted into a cavity of the polymeric washer or of the polymeric insert. See, e.g., Hasan U.S. Pat. No. 4,663,910 and Hasan U.S. Pat. No. 4,712,959. See, also, Dewey U.S. Pat. No. 4,380,413 and Reinwall et al. U.S. Pat. No. 4,630,984.

Also, it is known to form such an assembly wherein the roofing washer has a cavity, into which the screw head is fitted, and which is filled with a hardenable sealing compound. Such compound forms a hardened plug that prevents relative movement between the screw head and the roofing washer. See, e.g., Sandqvist U.S. Pat. No. 4,074,501. See, also, Triplett U.S. Pat. No. 4,686,808.

As a matter of related interest, it is known to form waterproof seals between the screw and the roofing washer and between the roofing washer and the roofing membrane beneath the roofing washer. See, e.g., the Sandqvist and Triplett patents noted above. See, also, Thiis-Evanson U.S. Pat. No. 4,282,050 and Francovitch U.S. Pat. No. 4,476,660.

Although various ways noted above to form an integral assembly of such screw and such a roofing washer may be generally satisfactory, there has been a need, to which this invention is addressed, for a better way to form such an assembly.

SUMMARY OF THE INVENTION

This invention provides an improved method of attaching a sheet of roofing material, such as a roofing membrane, to an underlayment, such as a metal or wooden deck. One or more layers of roofing material, such as a blanket of roofing insulation, may be interposed between the sheet of roofing material and the underlayment. This invention also provides an improved roofing construction, as made by the improved method.

The improved method employs a screw, which has a head and a threaded shank, and a composite roofing washer. Such washer is an assemblage of a metal roofing washer and a thermoplastic insert. The screw and the composite roofing washer are known components. The metal roofing washer has a countersunk cavity, which includes a central aperture.

The thermoplastic insert is made of a material, such as high density polyethylene or polypropylene, which flows when heated sufficiently, and which resolidifies when cooled to ambient temperatures prevailing where the method is practiced. Typically, the method is practiced on an exterior roof, on which ambient temperatures can rise to about 190° F.

The thermoplastic insert, which is inserted into the countersunk cavity of the metal roofing washer, has a central hub. Such hub extends through the central aperture of the metal roofing washer. The central hub is shaped so as to interlock the thermoplastic insert and the metal roofing washer.

The thermoplastic insert, which also has a central aperture, has a central socket. Such socket is adapted to receive the head of the screw when the screw is driven so that its threaded shank is driven through the central aperture of the thermoplastic insert. In the driven position of the screw, the head of the screw is received by the central socket and bears against the thermoplastic insert.

The screw is driven, as by a screw gun, so as to drive its threaded shank through the central aperture of the thermoplastic insert, through the sheet of roofing material and any layer or layers of roofing material between the sheet of roofing material and the underlayment, and into the underlayment, until the screw reaches the driven position.

In a novel step, which is contemplated by this invention, the thermoplastic insert is heated so as to cause some of its material to flow into the central socket and over at least part of the head of the screw. The thermoplastic material is permitted to cool. The screw, the metal roofing washer, and the thermoplastic insert become interlocked when the material caused to flow resolidifies.

In a preferred mode for carrying out the novel method, the novel method is used for attaching first and second roofing membranes to each other at an overlapped seam and to an underlayment. Such membranes are made of a material that can be heat-welded to itself so that the overlapped seam can be heat-welded. As an example, such membranes can be made of polyvinyl chloride which is thermoplastic.

After the screw has been driven so as to fasten the first membrane, the second membrane is laid so as to cover the composite roofing washer and the screw, and so as to overlap the first roofing membrane. Next, the roofing membranes are heated where the second roofing membrane overlaps the first roofing membrane, so as to weld the second roofing membrane to the first roofing membrane.

Heating the roofing membranes, as mentioned above, also heats the thermoplastic insert so as to cause some of the material of the thermoplastic insert to flow into the central socket and over at least part of the head of the screw. The overlapped seam and the thermoplastic insert are permitted to cool. Preferably, the thermoplastic insert is pressed, as by being rolled, before the material caused to flow resolidifies, whereby such material is formed in situ over at least part of the screw head. Thus, when the second membrane becomes welded to the first membrane at the overlapped seam, the screw becomes heat-sealed to the thermoplastic insert when the material caused to flow resolidifies. The metal roofing washer and the thermoplastic insert tend to remain interlocked.

Thus, an integral assembly of the screw, the thermoplastic insert, and the metal roofing washer is formed in a novel way. Hence, it becomes quite difficult for the screw to work loose, even when wind and other forces produce vibrations causing the metal roofing washer to act as a lever transmitting such forces to the head of the screw.

These and other objects, features, and advantages of this invention are evident from the following description of certain embodiments of this invention, with reference to the accompanying drawings.

DETAILED DESCRIPTION OF PREFERRED EMBODIMENT

Figure 1:
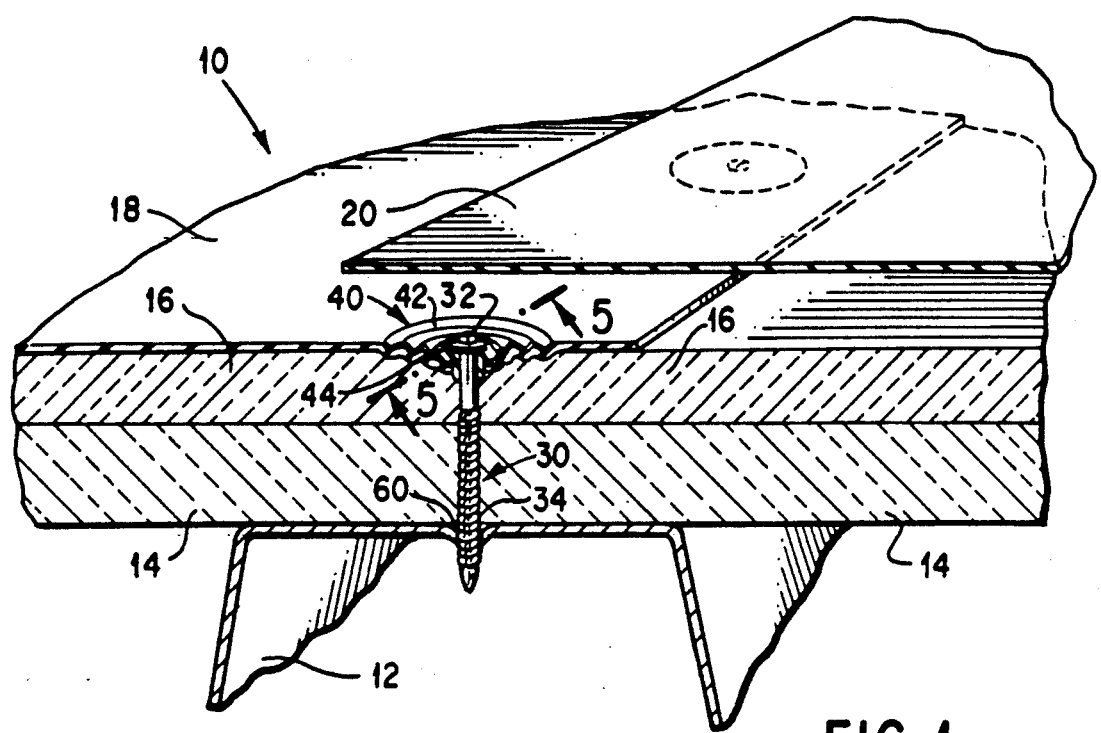
FIG. 1 is a partly fragmentary, partly sectioned, partly exploded, perspective view showing a roofing construction constituting a preferred embodiment, at a partly completed stage.
Figure 2:
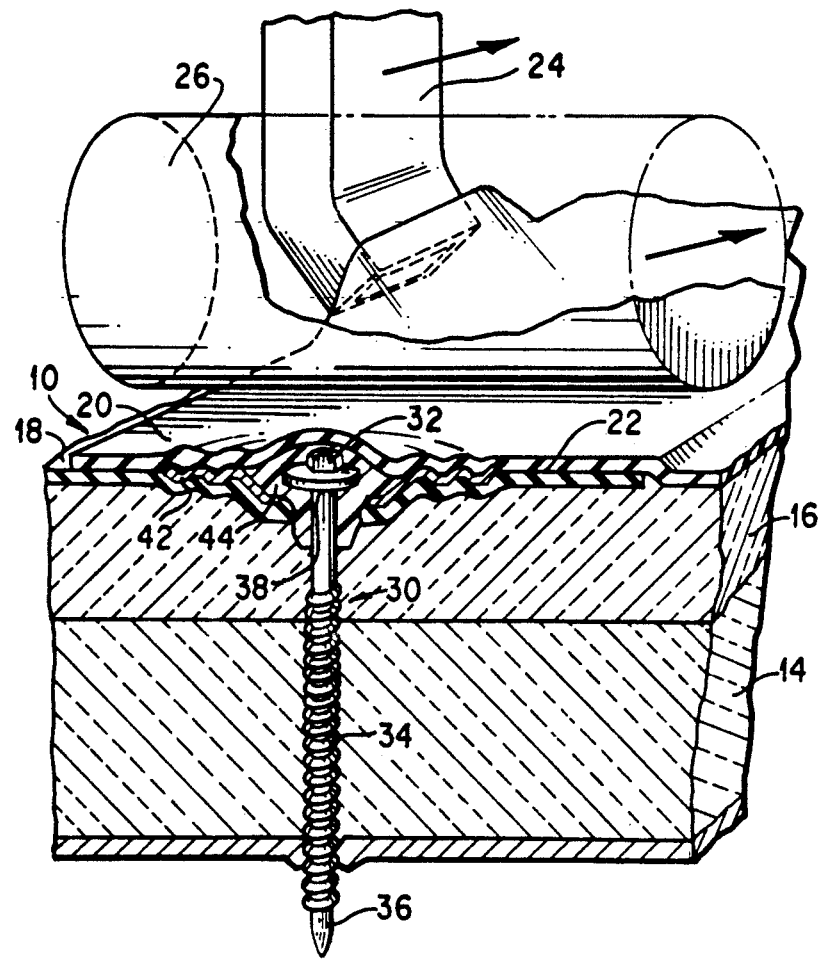
FIG. 2 is a similar, unexploded view showing the preferred roofing construction of FIG. 1, at a further completed stage. A seam-welding tool also is shown.

As shown in FIGS. 1 and 2, a roofing construction 10 constitutes a preferred embodiment of the roofing construction provided by this invention. The roofing construction 10 is made by a preferred mode for carrying out the improved method provided by this invention.

In the roofing construction 10, an underlayment 12 made of corrugated metal, such as galvanized steel, supports a lower layer 14 of roofing insulation, such as a slab of semi-rigid, fire-resistant, polymeric foam, and an upper layer 16 of roofing insulation, such as a semi-rigid, fire-resistant cellulosic board. The upper layer 16 of roofing insulation is covered, except where it is fastened to the underlayment 12 in a manner to be herein described, by a series of overlapped roofing membranes.

Each membrane is made from a material that can be heat-welded to itself, such as poly(vinyl chloride) which is thermoplastic. As shown, the roofing membranes noted above include a first roofing membrane 18 and a second roofing membrane 20, which is welded to the first membrane 18 at an overlapped seam 22.

A seam-welding tool, which is shown fragmentarily in FIG. 2, is used to weld the second membrane 20 to the first membrane 18 at the overlapped seam 22. The seam-welding tool includes a nozzle 24, which directs heated air between the first membrane 18 and the second membrane 20 so as to soften their surfaces that are to be heat-welded to each other, and a roller 26, which rolls the overlapped seam 22 before such surfaces have resolidified. Such tools are available commercially from various suppliers.

As shown, a screw 30, which has a head 32 and a threaded shank 34 with a pointed end 36, and a composite roofing washer 40, which is an assemblage of a metal roofing washer 42 and a thermoplastic insert 44, are used in the roofing construction 10. The head 32 of the screw 30 includes an integral washer 38. Suitable screws and composite roofing washers are available commercially from ITW-Buildex (a division of Illinois Tool Works Inc.) of Itasca, Illinois.

The metal roofing washer 42 is stamped from a sheet of galvanized steel so as to be generally circular, so as to have annular reinforcing ribs, and so as to have a countersunk cavity 46. Such cavity 46 includes a central aperture 48. The central aperture 48 is circular.

The thermoplastic insert 44 is molded from a thermoplastic material, such as high density polyethylene or polypropylene, which flows when heated sufficiently but resolidifies when cooled. High density polyethylene is preferred. Such material resolidifies when cooled to ambient temperatures prevailing where the roofing construction 10 is made, e.g., on an exterior roof where ambient temperatures can rise to about 190° F.

Figure 5:
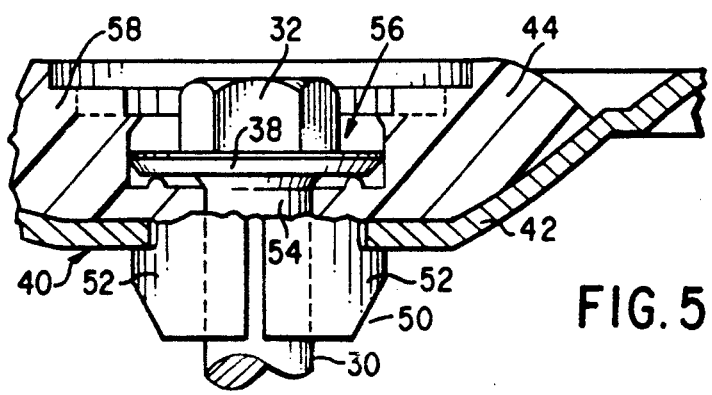
FIG. 5 is a further enlarged, fragmentary, sectional view of the same assemblage with the screw in its driven position.

The thermoplastic insert 44 is molded so as to have a central hub 50, which is split diametrically into two halves, as shown in FIG. 5. The central hub 46 is snap-fitted through the central aperture 48 of the metal roofing washer 42. The halves of the central hub 50 are shaped so as to have flanged portions 52, which fit beneath the metal roofing washer so as to interlock the thermoplastic insert 44 and the metal roofing washer 42.

The thermoplastic insert 44, which has a central aperture 54 extending through the central hub 50, has a central socket 56, which is adapted to receive the screw head 32 including the integral washer 38. The thermoplastic insert 44 has an annular lip 58, which has an inner diameter smaller than the outer diameter of the integral washer 38 on the screw head 32, and which snaps over the integral washer 38.

The screw 30 is driven, as by a screw gun (not shown) such as an ACCUDRIVE XL TM stand-up screw gun available commercially from ITW-Buildex, supra. The screw 30 is driven so as to drive its threaded shank 34 through the central aperture 54 of the thermoplastic insert 44, through the first membrane 18, through the upper layer 16 of roofing insulation, through the lower layer 14 of roofing insulation, and into the underlayment 12, until the screw 30 reaches a driven position. The threaded shank 34 is driven through the first membrane 18 at a location near one edge of such membrane 18. The pointed end 36 on the threaded shank 34 produces a hole 60 in the underlayment 12. The threaded shank 34 interlocks with the margin of the hole 60.

Furthermore, the thermoplastic insert 44 is heated, by the seam-welding tool noted above, as the membranes 18, 20, are heated so as to soften their surfaces that are to be heat-welded to each other. The nozzle 24 of such tool directs heated air onto the thermoplastic insert 44, as well as between the membranes 18, 20.

Figure 6:
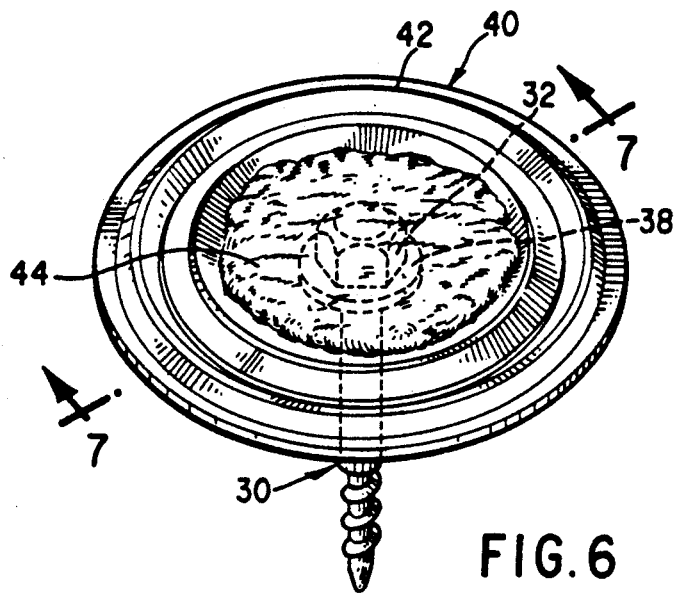
FIG. 6 is a perspective view of the same assemblage in a fully completed stage, in which a thermoplastic insert has been heat-sealed over the head of the screw of such assemblage, on a scale similar to the scale of FIG. 4.
Figure 7:
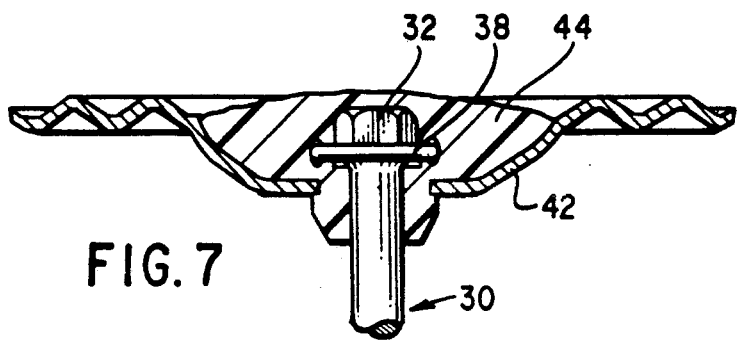
FIG. 7 is a sectional view taken along line 7—7 of FIG. 6 in a direction indicated by arrows.

Heating the thermoplastic insert 44, as mentioned above, causes some of the material of such insert 44 to flow into the central socket 56 of such insert 44 and over at least part of the head 32 of the screw 30, as shown in FIGS. 6 and 7. After the overlapped seam 22 has been formed, the heating step is terminated, and the overlapped seam 22 and the thermoplastic insert 44 are permitted to cool.

Thus, the screw 30 becomes heat-sealed to the thermoplastic insert 44 when the material caused to flow resolidifies. The roller 16, which rolls the overlapped seam 22 as mentioned above, presses indirectly on the thermoplastic insert 44 before such material resolidifies, whereby the thermoplastic material of such insert 44 is formed in situ over at least part of the screw head 32. The metal roofing washer 42 and the thermoplastic insert 44 tend to remain interlocked, as mentioned above, at the flanged portions 52 of the central hub 50 of such insert 44.

Thus, when the second membrane 20 becomes welded to the first membrane 18 at the overlapped seam 22, an integral assembly of the screw 30, the thermoplastic insert 44, and the metal roofing washer 42 is formed. Hence, it becomes quite difficult for the screw 30 to work loose, even when wind and other forces produce vibrations causing the metal roofing washer 42 to act as a lever transmitting such forces to the head 32 of the screw 30.

Figure 3:
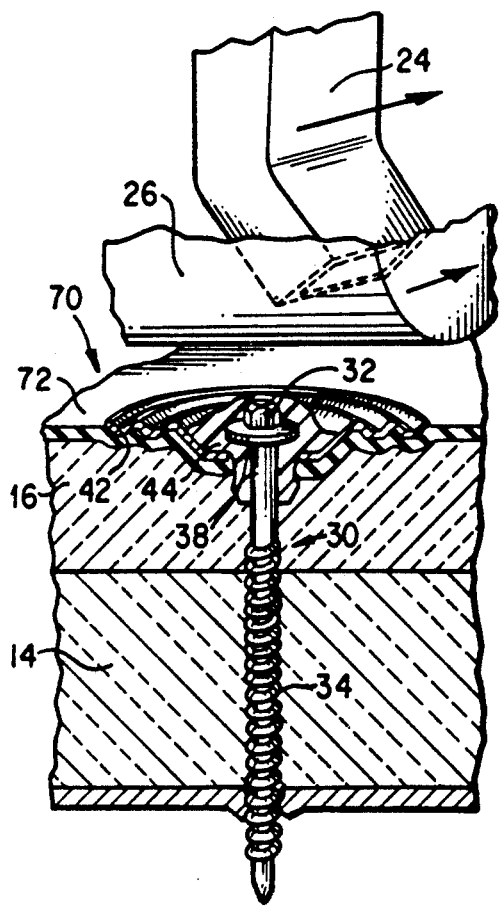
FIG. 3 is a similar, unexploded view of a roofing construction constituting a simplified embodiment, at a completed stage. The seam-welding tool again is shown.
Figure 4:
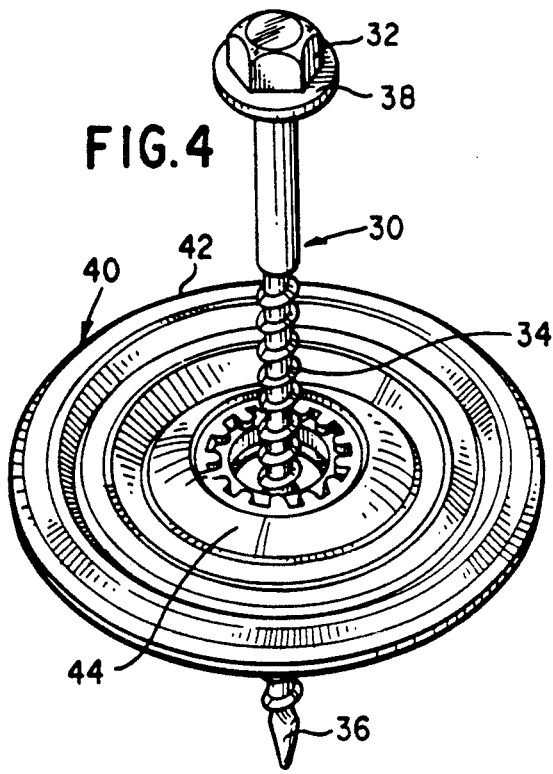
FIG. 4 is an enlarged, exploded, perspective view of a typical screw and roofing washer assemblage, as used in the roofing construction of FIGS. 1 and 2 and in the roofing construction of FIG. 3.

As shown in FIG. 3, a roofing construction 70 constitutes a simplified embodiment of the roofing construction provided by this invention. The roofing construction 70 is made by a simplified mode for carrying out the improved method provided by this invention.

The roofing construction 70 is similar to the roofing construction 10 and comprises components similar to components of the roofing construction 10, as indicated by similar reference numbers in FIG. 3, except that a single roofing membrane 72 is used in such part of the roofing construction 70 as is shown. Therefore, in the roofing construction 70, it is not necessary for the material of the roofing membrane 72 to be heat-weldable to itself.

The seam-welding tool noted above is used to heat the thermoplastic insert 44 directly so as to cause some of the material of the thermoplastic insert 44 to flow into the central socket 56 of such insert 44 and over at least part of the head 32 of the screw 30. The nozzle 74 of such tool directs heated air over the thermoplastic insert 44. The roller 26 of such tool rolls such insert 44 so as to press on such insert 44 before the material caused to flow resolidifies.

As shown in FIGS. 8 through 11, a modified roofing washer 40' is useful in either roofing construction described above. The modified roofing washer 40' is an assemblage of a metal roofing washer 42', which is similar to the metal roofing washer 42 except as noted below, and a thermoplastic insert 44', which is similar to the thermoplastic insert 44. A screw 30', which is similar to the screw 30, is used with such washer 40'.

Figure 8:
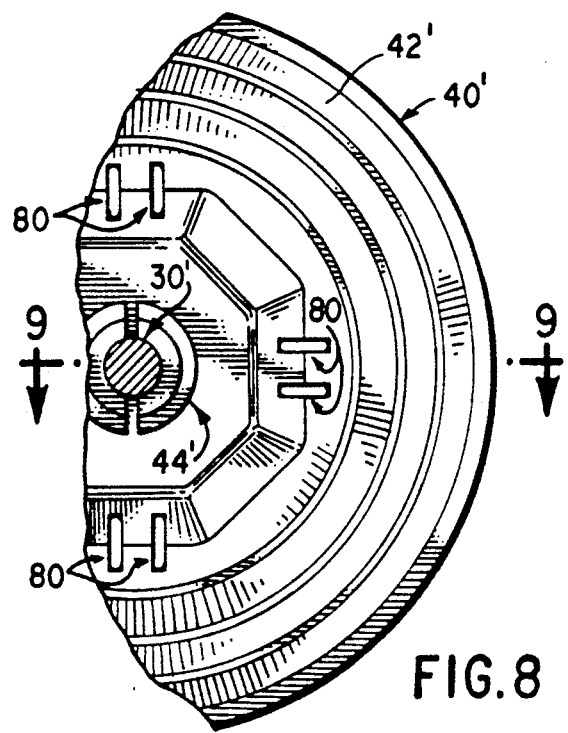
FIG. 8 is a fragmentary, plan view of the underside of a modified screw and roofing washer assemblage according to this invention, before the thermoplastic insert has been heated.
Figure 9:
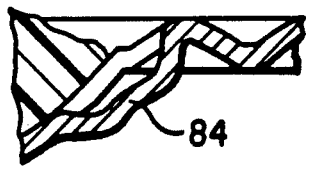
FIG. 9 is a sectional view taken along line 9—9 of FIG. 8 in a direction indicated by arrows.
Figure 10:
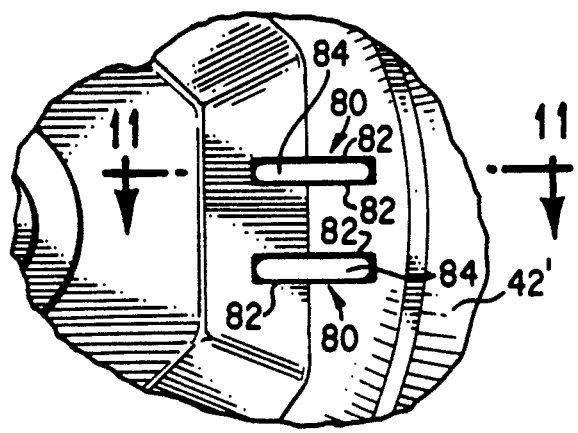
FIG. 10 is a view similar to FIG. 8 but taken on a larger scale after the thermoplastic insert has been heated.
Figure 11:
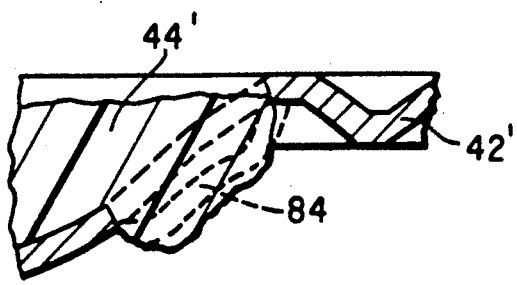
FIG. 11 is a sectional view taken along line 11—11 of FIG. 10 in a direction indicated by arrows.

The metal roofing washer 42' differs from the metal roofing washer 42 in having multiple pairs of notches 80, which extend through the metal roofing washer 42' in spaced relation to its central aperture 48', as shown in FIGS. 8 and 9. Each of the notches 80 is formed in a stamping operation, by making two parallel slits 82 and displacing a narrow strip 84 of metal between the parallel slits 80. When the thermoplastic insert 44 is heated, some of the material of such insert 44 is caused to flow into the notches 80, as well as into a central socket (not shown) of the thermoplastic insert 44' and over at least part of the head (not shown) of the screw 30'. Thus, the thermoplastic insert 44' becomes heat-sealed to the metal roofing washer 42', at the notches 80, when the material caused to flow into the notches 80 resolidifies.

Other modifications may be also made without departing from the scope and spirit of this invention.

We claim:

1. A method of attaching a sheet of roofing material, such as a roofing membrane, to an underlayment, such as a metal or wooden deck, possibly with one or more layers of roofing material, such as a blanket of roofing insulation, between the sheet of roofing material and the underlayment, the method comprising:

(a) providing a screw having a head and having a threaded shank, (b) providing a composite roofing washer being an assemblage of (1) a metal roofing washer having a central aperture and having a countersunk cavity, which includes the central aperture, (2) a thermoplastic insert, which is made of a material that flows when heated sufficiently and that resolidifies when cooled to ambient temperatures prevailing where the method is practiced, the thermoplastic insert being inserted into the countersunk cavity of the metal roofing washer and having a central hub, the central hub extending through the central aperture of the metal roofing washer and being shaped so as to interlock the thermoplastic insert and the metal roofing washer, the thermoplastic insert having a central aperture and having a central socket, the central socket being adapted to receive the head of the screw, (c) driving the screw so as to drive the threaded shank of the screw through the central aperture of the thermoplastic insert, through the sheet of roofing material and any layer or layers of roofing material between the sheet of roofing material and the underlayment, and into the underlayment until the head of the screw is received by the central socket and bears against the thermoplastic insert, (d) heating the thermoplastic insert so as to cause some of the material of the thermoplastic insert to flow into the central socket and over at least part of the head of the screw, while the thermoplastic insert and the metal roofing washer remain interlocked at the central hub, thereby to heat-seal the screw to the thermoplastic insert when the material caused to flow resolidifies, and (e) terminating step (d) so that the thermoplastic insert can cool and pressing on the thermoplastic insert after the thermoplastic insert has been heated but before the material caused to flow has resolidified.

2. A roofing construction comprising a sheet of roofing material, such as a roofing membrane, and an underlayment, such as a metal or wooden deck, the sheet of roofing material having been attached to the underlayment by the method of claim 1, possibly with one or more layers of roofing insulation between the sheet of roofing material and the underlayment.

3. A method of attaching first and second roofing membranes to each other at an overlapped seam and to an underlayment, such as a metal or wooden deck, possibly with one or more layers of roofing material, such as a blanket of roofing insulation, between the first and second roofing membranes and the underlayment, the first and second membranes being made of a material that can be heat-welded to itself so that the overlapped seam can be heat-welded, the method comprising:
  (a) providing a screw having a head and having a threaded shank,
  (b) providing a composite roofing washer being an assemblage of
    (1) a metal roofing washer having a central aperture and having a countersunk cavity, which includes the central aperture, and
    (2) a thermoplastic insert, which is made of a material that flows when heated sufficiently and that resolidifies when cooled to ambient temperatures prevailing where the method is practiced, the thermoplastic insert being inserted into the countersunk cavity and having a central hub, the central hub extending through the central aperture of the metal roofing washer and being shaped so as to interlock the thermoplastic insert and the metal roofing washer, the thermoplastic insert having a central aperture and having a central socket, the central socket being adapted to receive the head of the screw,
  (c) driving the screw so as to drive the threaded shank of the screw through the central aperture of the thermoplastic insert, through the first roofing membrane and any layer or layers of roofing material between the first roofing membrane and the underlayment, and into the underlayment, until head of the screw is received by the central socket and bears against the thermoplastic insert,
  (d) laying the second roofing membrane so as to cover the composite roofing washer and the screw, and so as to overlap the first roofing membrane,
  (e) heating the roofing membranes where the second roofing membrane overlaps the first roofing membrane so as to weld the second roofing membrane to the first roofing membrane at an overlapped seam and heating the thermoplastic insert so as to cause some of the material of the thermoplastic insert to flow into the central socket and over at least part of the head of the screw, thereby to heat-seal the screw to the thermoplastic insert when the material caused to flow resolidifies, and
  (f) forming the overlapped seam, permitting the overlapped seam and the thermoplastic insert to cool, and pressing on the thermoplastic insert after the overlapped seam has been formed but before the material caused to flow has resolidified.

4. The method of claim 3 wherein the thermoplastic insert is pressed, by rolling the overlapped seam, after the overlapped seam has been formed but before the material caused to flow has resolidified.

5. A roofing construction comprising first and second roofing membranes, as made of a material that can be heat-welded to itself, and an underlayment, such as a metal or wooden deck, the first and second roofing membranes having been attached to each other at an overlapped seam and to the underlayment by the method of claim 3, possibly with one or more layers of roofing material, such as a blanket of roofing insulation, between the first and second roofing membranes and the underlayment.

6. A roofing construction comprising first and second roofing membranes, as made of a material that can be heat-welded to itself, and an underlayment, such as a metal or wooden deck, the first and second roofing membranes having been attached to each other at an overlapped seam and to the underlayment by the method of claim 4, possibly with one or more layers of roofing material, such as a blanket of roofing insulation, between the first and second roofing membranes and the underlayment.

7. A method of attaching first and second roofing membranes to each other at an overlapped seam and to an underlayment, such as a metal or wooden deck, possibly with one or more layers of roofing material, such as a blanket of roofing insulation, between the first and second roofing membranes and the underlayment, the first and second membranes being made of a material that can be heat-welded to itself so that the overlapped seam can be heat-welded, the method comprising
  (a) providing a screw having a head and having a threaded shank,
  (b) providing a composite roofing washer being an assemblage of
    (1) a metal roofing washer having a central aperture and having a countersunk cavity, which includes the central aperture, the metal roofing washer having a plurality of notches, which extend through the metal roofing washer in spaced relation to the central aperture, and
    (2) a thermoplastic insert, which is made of a material that flows when heated sufficiently and that resolidifies when cooled to ambient temperatures prevailing where the method is practiced, the thermoplastic insert being inserted into the countersunk cavity and having a central hub, the central hub extending through the central aperture of the metal roofing washer and being shaped so as to interlock the thermoplastic insert and the metal roofing washer, the thermoplastic insert having a central aperture and having a central socket, which is adapted to receive the head of the screw,
  (c) driving the screw so as to drive the threaded shank of the screw through the central aperture of the thermoplastic insert, through the first roofing membrane and any layer or layers of roofing material between the first roofing membrane and the underlayment, and into the underlayment, until the head of the screw is received by the central socket and bears against the thermoplastic insert,
  (d) laying the second roofing membrane so as to cover the composite roofing washer and the screw, and so as to overlap the first roofing membrane,
  (e) heating the roofing membranes where the second roofing membrane overlaps the first roofing membrane so as to weld the second roofing membrane to the first roofing membrane at an overlapped seam, and so as to cause some of the material of the thermoplastic insert to flow into the central socket, through the plurality of notches, and over at least part of the head of the screw, thereby to heat-seal the screw to the metal roofing washer and the thermoplastic insert to the metal roofing washer when the material caused to flow resolidifies, and (f) forming the overlapped seam and permitting the overlapped seam and the thermoplastic insert to cool.

8. The method of claim 7 further comprising a step of pressing on the thermoplastic insert before the material caused to flow has resolidified.

9. The method of claim 7 further comprising a step of pressing on the thermoplastic insert, by rolling the overlapped seam, after the overlapped seam has been formed but before the material caused to flow has resolidified.

10. A roofing construction comprising first and second roofing membranes, as made of a material that can be heat-welded to itself, and an underlayment, such as a metal or wooden deck, the first and second roofing membranes having been attached to each other at an overlapped seam and to the underlayment by the method of claim 7, possibly with one or more layers of roofing material, such as a blanket of roofing insulation, between the first and second roofing membranes and the underlayment.

11. A roofing construction comprising first and second roofing membranes, as made of a material that can be heat-welded to itself, and an underlayment, such as a metal or wooden deck, the first and second roofing membranes having been attached to each other at an overlapped seam and to the underlayment by the method of claim 8, possibly with one or more layers of roofing material, such as a blanket of roofing insulation, between the first and second roofing membranes and the underlayment.

12. A roofing construction comprising first and second roofing membranes, as made of a material that can be heat-welded to itself, and an underlayment, such as a metal or wooden deck, the first and second roofing membranes having been attached to each other at an overlapped seam and to the underlayment by the method of claim 8, possibly with one or more layers of roofing material, such as a blanket of roofing insulation, between the first and second roofing membranes and the underlayment.

13. A heat-sealed screw-washer assemblage useful to attach a sheet of roofing material to an underlayment, possibly with one or more layers of roofing material between the sheet and the underlayment, the assemblage comprising:

(a) a washer having a central portion made of a thermoplastic material, the central portion having a central socket including a central aperture, and (b) a screw having a shank and a head and being assembled to the washer so that the shank extends through the central aperture and so that the head is received in the central socket, the washer being heat-sealed to the screw where some of the material of the washer has been caused to flow over the head and has resolidified, wherein the washer is a composite washer including a metal washer and a thermoplastic insert, which constitutes the central portion, and wherein the metal washer has a plurality of notches, which extend through the metal washer in spaced relation to the central aperture, the thermoplastic insert being heat-sealed to the metal washer by some of the material of the thermoplastic washer at the notches, into which come of the material of the thermoplastic washer has been caused to extend and has resolidified.

* * * * *